(12) United States Patent
An et al.

(10) Patent No.: US 9,897,817 B2
(45) Date of Patent: Feb. 20, 2018

(54) SYSTEM AND METHOD FOR INSPECTING MISALIGNMENT BETWEEN DISPLAY PANEL AND FILM PATTERNED RETARDER

(71) Applicant: LG Display Co., Ltd., Seoul (KR)

(72) Inventors: Hyeyoun An, Gangwon-do (KR); Sunghyun Bae, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1158 days.

(21) Appl. No.: 13/688,127

(22) Filed: Nov. 28, 2012

(65) Prior Publication Data

US 2013/0135721 A1 May 30, 2013

(30) Foreign Application Priority Data

Nov. 30, 2011 (KR) .................. 10-2011-0126837

(51) Int. Cl.
  *G02B 27/22* (2006.01)
  *G02B 27/26* (2006.01)
  *G02B 5/30* (2006.01)

(52) U.S. Cl.
  CPC ......... *G02B 27/2228* (2013.01); *G02B 27/26* (2013.01); *G02B 5/3083* (2013.01)

(58) Field of Classification Search
  CPC .... G06T 15/00; H04N 13/00; H04N 13/0434; H04N 13/0425; H04N 15/00; G02B 27/26; G02B 27/2228; G02B 27/222; G02B 5/3083; G02B 5/30; G06F 1/133; G05D 3/12; B32B 38/18; B32B 38/33; B32B 38/1858; B32B 38/10; B32B 2457/20; B32B 41/00; Y10T 156/1744
  USPC ......... 349/15, 465; 348/51, 57, 58; 359/464; 156/350, 556, 379
  See application file for complete search history.

(56) References Cited

U.S. PATENT DOCUMENTS

2011/0255018 A1* 10/2011 Roh .................. G02B 27/26
                                                               349/15
2012/0314103 A1* 12/2012 Majewicz ............ H04N 5/2354
                                                               348/239

FOREIGN PATENT DOCUMENTS

CN       101581842 A      11/2009
JP       2003-075773 A     3/2003

OTHER PUBLICATIONS

State Intellectual Property Office of the People's Republic of China, First Office Action, Chinese Patent Application No. 201210465337.0, dated Aug. 15, 2014.

(Continued)

*Primary Examiner* — Stephone B Allen
*Assistant Examiner* — Jyotsna Dabbi
(74) *Attorney, Agent, or Firm* — Fenwick & West LLP

(57) ABSTRACT

A system and a method for inspecting misalign between a display panel and a film patterned retarder (FPR) in the stereoscopic image display separating polarized lights of a left-eye image and a right-eye image using the FPR. The system for inspecting misalign between a display panel and a film patterned retarder includes: an inspection target panel including the display panel to which the film patterned retarder adheres; a misalign inspector for imaging edge images of both sides of the inspection target panel or imaging a central image of a pixel array of the inspection target panel; and a controller for analyzing an image received from the misalign inspector to measure a misalign degree between the film patterned retarder and the display panel.

12 Claims, 14 Drawing Sheets

(56) References Cited

OTHER PUBLICATIONS

Korean Office Action, Korean Application No. 10-2011-0126837, dated Sep. 20, 2017, 6 pages. (with concise explanation of relevance).

* cited by examiner

--- PNL center line (PNLCTL)  ——— FPR center line (FPRCTL)

--- PNL center line (PNLCTL)  ——— FPR center line (FPRCTL)

SYSTEM AND METHOD FOR INSPECTING MISALIGNMENT BETWEEN DISPLAY PANEL AND FILM PATTERNED RETARDER

CROSS REFERENCE TO RELATED APPLICATIONS

This application claims the benefit of Korean Patent Application No. 10-2011-0126837 filed on Nov. 30, 2011, the entire contents of which are incorporated herein by reference for all purposes as if fully set forth herein.

BACKGROUND

Field

This document relates to a stereoscopic image display and more particularly, to a system and a method for inspecting misalign between a display panel and a film patterned retarder (FPR) in the stereoscopic image display separating polarized lights of a left-eye image and a right-eye image using the FPR.

Related Art

A stereoscopic image display implements a three-dimensional (3D) image using a stereoscopic technique or an autostereoscopic technique.

The stereoscopic technique uses a parallax image of left and right eyes having a great stereoscopic effect, and may be divided into a glasses type and an auto-stereoscopic type. The glasses type displays an image on a direct view display device or a projector by changing a polarization direction of left and right parallax images or in a time division scheme, and implements a stereoscopic image using polarization glasses or shutter glasses. The auto-stereoscopic type generally implements a stereoscopic image by installing optical components such as a parallax barrier and a lenticular lens for separating optical axes of left and right parallax images in a front or rear side of a display screen.

In the glasses type stereoscopic image display, the polarization glasses type requires a polarization separation device, such as a patterned retarder, to be bonded to a display panel. The patterned retarder separates the polarized lights of a left-eye image and a right-eye image displayed on the display panel. A viewer wears polarization glasses when viewing a stereoscopic image on the polarization glasses type stereoscopic image display to see the polarized light of the left-eye image through a left-eye filter of the polarization glasses and the polarized light of the right-eye image through a right-eye filter of the polarization glasses, thereby giving a stereoscopic feeling.

Meanwhile, the shutter glasses type alternately displays a left-eye image and a right-eye image on a display panel without bonding a special polarization separation device to the display panel, opens a left-eye shutter of shutter glasses to be synchronized with the left-eye image, and opens a right-eye shutter of the shutter glasses to be synchronized with the right-eye image. A viewer wears shutter glasses when viewing a stereoscopic image on the shutter glasses type stereoscopic image display to alternately see the left-eye image and the right-eye image which are time-divided, thereby giving a stereoscopic feeling.

In the shutter glasses type stereoscopic image display, since it is unnecessary to mount a polarization separation device in the display panel, a factor of increasing a cost of the display panel is small. However, because there is a need for high cost shutter glasses, manufacturing cost is high. In a 3D image quality side, because the shutter glasses type stereoscopic image display time-divides the left-eye image and the right-eye image at a predetermined time interval, the shutter glasses type stereoscopic image display is weak to flicker and 3D crosstalk. Meanwhile, the polarization glasses type stereoscopic image display includes a polarization separation device such as a patterned retarder mounted in the display panel, a cost of the display panel is slightly increased. However, because low cost polarization glasses are used, a total system cost is lower compared with shutter glassed type. In the image quality side, the polarization glasses type stereoscopic image display simultaneously displays a left-eye image and a right-eye image on the display panel and separates the left-eye image and the right-eye image for each line, flicker and 3D crosstalk levels are lower as compared with the shutter glasses type stereoscopic image display.

The patterned retarder is divided into a glass patterned retarder (GPR) in which a patterned retarder is formed on a glass substrate and a film patterned retarder (FPR) in which the patterned retarder is formed on a film substrate. In recent years, the FPR is capable of reducing a thickness, a weight, and a cost of a display panel as compared with the GPR has been preferred.

In the polarization glasses type stereoscopic image display, a method of aligning and bonding the display panel and the patterned retarder is a very important technique determining 3D display quality. A method of confirming or inspecting a misalign degree between an FPR and a display panel in a manufacturing process of the polarization glasses type stereoscopic image display is not established yet.

Strength of a base film in the FPR is lowered and the FPR is flexible so that a straight degree may be reduced. The FPR having a low straight degree is bent. For this reason, it is difficult to exactly align the FPR having a low straight degree in display lines of a display panel having a high straight degree. If the FPR is misaligned in the display panel due to the FPR having a low straight degree, failure in a viewing angle such as a case where up and down viewing angles of a stereoscopic image display may become narrow or a case where up and down viewing angles differ from each other may occur.

SUMMARY

The present invention has been made in an effort to provide a system for inspecting misalign between a display panel and an FPR capable of measuring misalign between the display panel and the FPR, and a method thereof.

According to an embodiment of the present invention, there is provided a system for inspecting misalignment between a display panel and a film patterned retarder including: an inspection target panel including the display panel to which the film patterned retarder adheres; a misalign inspector for imaging edge images of both sides of the inspection target panel or imaging a central image of a pixel array of the inspection target panel; and a controller for analyzing an image received from the misalign inspector to measure a misalign degree between the film patterned retarder and the display panel.

According to another embodiment of the present invention, there is provided a system for inspecting misalignment between a display panel and a film patterned retarder including: an inspection target panel including the display panel to which the film patterned retarder adheres; a misalign inspector for imaging edge images of both sides of the inspection target panel and imaging a central image of a pixel array of the inspection target panel; and a controller for analyzing an image received from the misalign inspector to measure the misalign degree between the film patterned retarder and the display panel.

According to another aspect of the present invention, there is provided a method of inspecting misalignment between a display panel and a film patterned retarder on an inspection target panel including the display panel to which the film patterned retarder adheres, including: imaging edge images of both sides of the inspection target panel or imaging a central image of a pixel array of the inspection target panel; and analyzing at least one image imaged from the inspection target panel to measure a misalign degree between the film patterned retarder and the display panel.

According to another embodiment of the present invention, there is provided a method of inspecting misalignment between a display panel and a film patterned retarder on an inspection target panel including the display panel to which the film patterned retarder adheres, including: imaging edge images of both sides of the inspection target panel and imaging a central image of a pixel array of the inspection target panel; and analyzing at least one image imaged from the inspection target panel to measure the misalign degree between the film patterned retarder and the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawing.

DETAILED DESCRIPTION

Figure 1A:
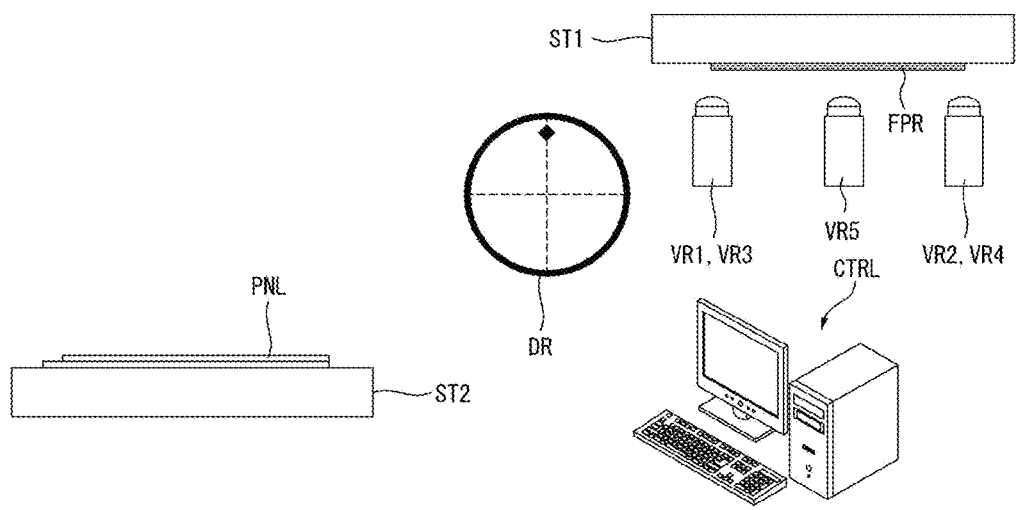
FIGS. 1A to 1D are diagrams illustrating a system and a method for aligning a display panel and an FPR by stages according to an exemplary embodiment of the present invention.

Hereinafter, exemplary embodiments of the present invention will be described in detail with reference to the attached drawings. Throughout the specification, the same reference numerals indicate substantially the same components. Further, in the following description, well-known functions or constructions related to the present invention will not be described in detail if it appears that they could obscure the invention in unnecessary detail.

The stereoscopic image display of the present invention includes a patterned retarder to be bonded to a display panel, and is implemented by a polarization glasses type stereoscopic image display requiring polarization glasses.

FIGS. 1A to 1D are diagrams illustrating a system and a method for aligning a display panel and an FPR by stages according to an exemplary embodiment of the present invention.

Referring to FIGS. 1A to 1D, an alignment system of the present invention includes a first align stage ST1, a first vision system VR1, VR2, VR3, VR4, and VR5, a second align stage ST2, a second vision system VP1, VP2, VP3, and VP4, a drum DR, and a controller CTRL.

Figure 3:
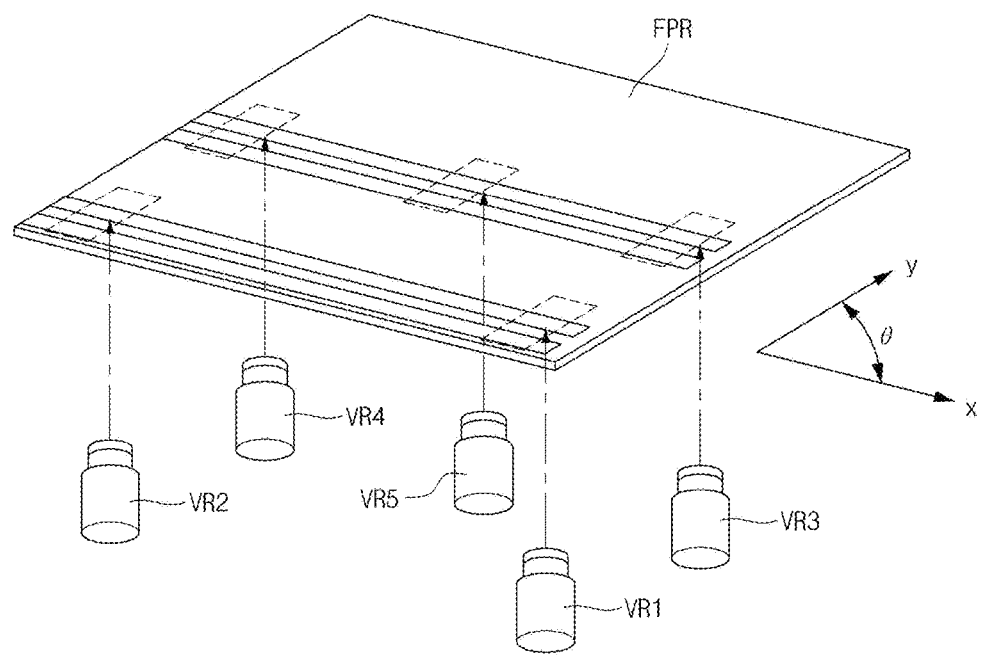
FIG. 3 is a perspective view illustrating the FPR and a first vision system according to one embodiment.

The first align stage ST1 absorbs an FPR and minutely controls a position of the FPR in the x axis, y axis, and θ directions under the control of the controller CTRL to correct a location error of the FPR as shown in FIG. 3. The first align stage ST1 may perform a straight line motion by a robot which is not shown to advance and back.

Figure 2:
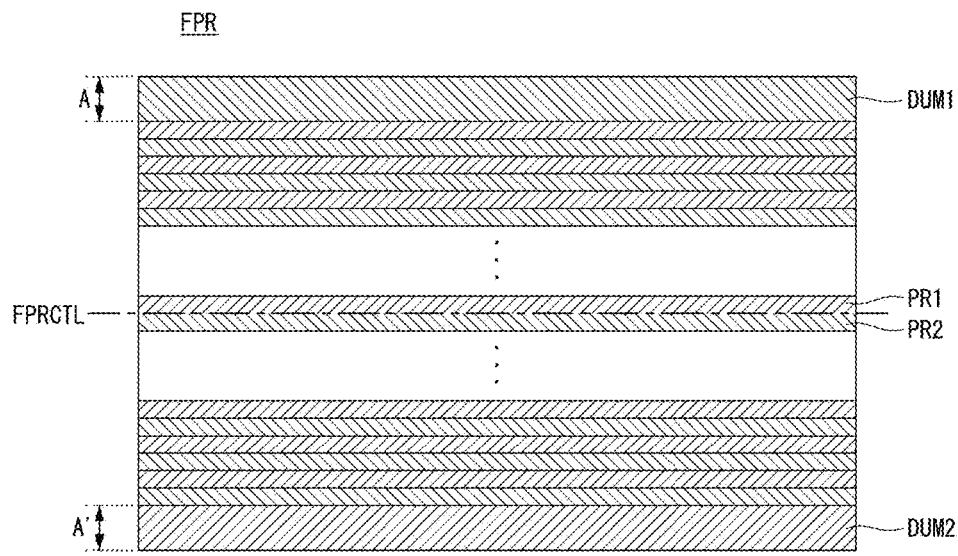
FIG. 2 is a plan view illustrating a structure of the FPR shown in FIGS. 1A to 1D according to one embodiment.

The FPR includes first and second retardation patterns PR1 and PR2 for separating polarized lights of a left-eye image and a right-eye image as shown in FIG. 2. The FPR includes an array region on which the first and second retardation patterns PR1 and PR2 are alternately displayed and dummy regions located at upper and lower ends outside the array region. The array region of the FPR faces the pixel array region in the display panel PNL on which the image is displayed and selects polarized light of an image incident from the pixel array region.

Optical axes of the first and second retardation patterns PR1 and PR2 are orthogonal to each other. The first and second retardation patterns PR1 and PR2 separate the polarized lights of the left-eye image and the right-eye image which are displayed on the display panel PNL. The optical axes of the first and second retardation patterns PR1 and PR2 are orthogonal to each other. For example, the first retardation pattern PR1 transmits light of the left-eye image (or right-eye image) displayed on the odd numbered line as right circular polarized light by delaying a phase of light incident from the odd numbered line by a one-quarter wavelength (¼λ) to face an odd numbered line in a pixel array of the display panel PNL. The second retardation pattern PR2 transmits light of the right-eye image (or left-eye image)

displayed on an even numbered line as a left circular polarized light by delaying a phase of light incident from the even numbered line by a three-quarter wavelength (¾λ) to face the even numbered line in a pixel array of the display panel PNL.

Widths of dummy patterns DUM1 and DUM2 formed on the dummy regions of the FPR may differ from those of the first and second retardation patterns PR1 and PR2 so that the dummy patterns DUM1 and DUM2 are easily identified from the first and second retardation patterns PR1 and PR2. The dummy patterns DUM1 and DUM2 have a polarization property of one of the first and second retardation patterns PR1 and PR2. An upper dummy pattern DUM1 may have the same or a different polarization property as that of a lower dummy pattern DUM2. For example, the upper dummy pattern DUM1 and the lower dummy pattern DUM2 may transmit only left circular polarized light or right circular polarized light. In addition, the upper dummy pattern DUM1 may transmit the right circular polarized light (or left circular polarized light) and the lower dummy pattern DUM2 may transmit the left circular polarized light (or right circular polarized light). When aligning the FPR and the display panel PNL, the dummy patterns DUM1 and DUM2 are used as reference patterns for confirming upper/lower edge locations of the FPR.

The first vision system VR1 through VR5 transmits an image acquired by imaging five edges of the FPR fixed on the first align state ST1 to the controller CTRL. The first and second vision modules VR1 and VR2 image dummy pattern images of both sides of a top end and a bottom end of the FPR. Third and fourth vision modules VR3 and VR4 image images of both sides of the center of the FPR. A fifth vision module VR5 images a central image in a center line of the FPR. The fifth vision module VR5 may be omitted. For example, when the first to fourth vision modules VR1 through VR4 are moved or the first align stage ST1 is moved, the central image in the center line of the FPR may be imaged by one of the vision modules VR1 through VR4. If the first vision module VR5 is used to acquire the central image in the center line of the FPR, it is unnecessary to additionally move the FPR or the first vision system VR1 through VR5. The first vision system VR1 through VR5 serves as an image sensor for detecting a preset location in the FPR under control of the controller CTRL.

Each of the vision modules of the first vision system VR1 through VR5 includes a camera (i.e., an image sensor) and a polarizing plate provided between a camera lens of the camera and the FPR. The polarizing plate transmits only polarized light incident from one of the first and second retardation patterns PR1 and PR2. Vision modules of the first vision system VR1 through VR5 image (i.e., display) an image of the FPR in a preset location and transmits the image to the controller CTRL. One of the first and second retardation patterns PR1 and PR2 is viewed with a white gray level and the other is viewed with a black gray level in the image imaged (i.e., displayed) by the vision modules VR1 through VR5.

The controller CTRL previously stores a distance between the dummy patterns DUM1 and DUM2 and a center line of the FPR. Accordingly, the controller CTRL may confirm the dummy patterns DUM1 and DUM2 to know a location of a center line of the FPR spaced apart from locations of the dummy patterns DUM1 and DUM2 by a predetermined distance. The center line of the FPR is not formed by a separate process but may be set to a boundary line between the first and second retardation patterns PR1 and PR2 which are located in the center of the FPR.

The controller CTRL may confirm an image imaged by the first and second vision modules VR1 and VR2 to confirm the dummy patterns DUM1 and DUM2 of the FPR. The controller CTRL may compare the images imaged by the third and fourth vision modules VR3 and VR4 with a virtual reference line to control a position of the FPR mounted on the first stage ST1 in the x axis, y axis, and θ axis directions, thereby matching the center line of the FPR with the virtual reference line. The controller CTRL may analyze an image imaged by the fifth vision module VR5 to determine a location of a center line in a central part of the FPR. The controller CTRL may compare and analyze images imaged by the fifth vision module VR5 with the images imaged by the third and fourth vision modules VR3 and VR4 to confirm a bending degree of the retardation patterns PR1 and PR2. When a straight degree of the FPR is low, the controller CTRL analyzes a central image of the FPR imaged by one of the fifth vision module VR5 or the third and fourth vision modules VR3 and VR4 to match a central part of the center line of the FPR with the virtual reference line.

Figure 9:
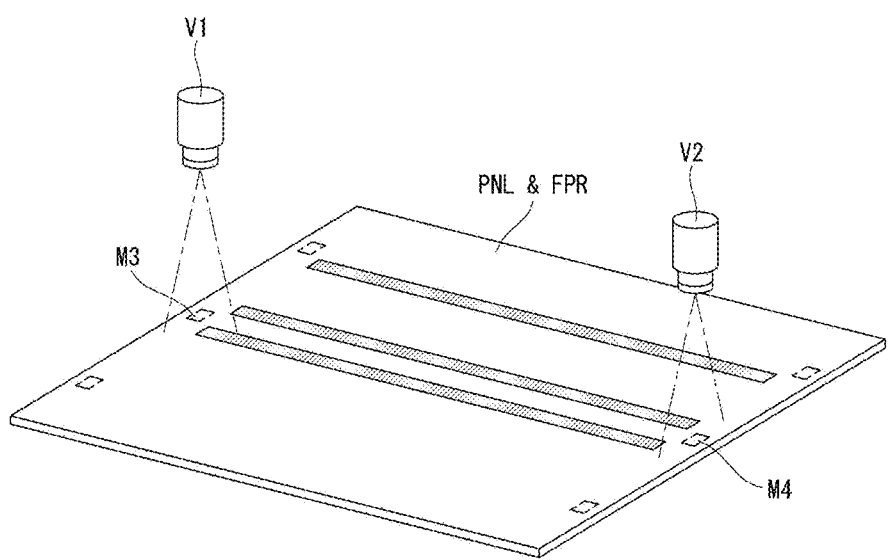
FIG. 9 is a diagram illustrating an apparatus for inspecting misalignment according to one embodiment of the present invention.
Figure 13:
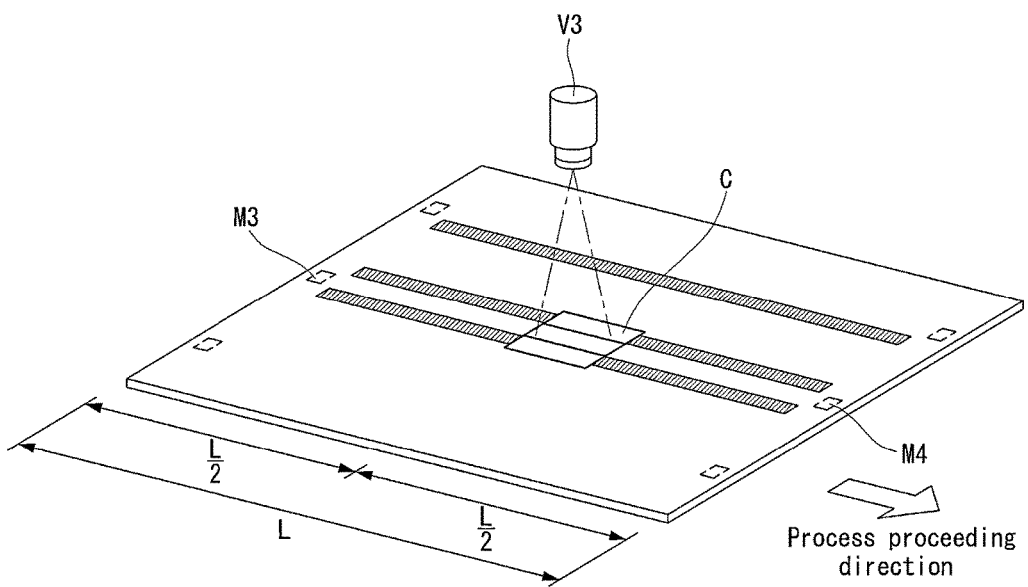
FIG. 13 is a diagram illustrating an apparatus for inspecting misalignment according to one embodiment of the present invention.

The controller CTRL may receive and analyze image data imaged by vision modules of the apparatus for inspecting misalignment as shown in FIGS. 9 and 13 to determine a misalign degree. The controller CTRL stores various pixel patterns corresponding to various models of the display panel PNL in order to determine the misalign degree based on an image received from the apparatus for inspecting misalign as shown in FIG. 13. The controller CTRL includes an edge detection filter for determining a misalign degree based on the image received from the apparatus for inspecting misalign as shown in FIG. 13 and an operational circuit executing a preset misalign inspecting algorithm. The edge detection filter detects an edge from the received image to extract a form of a pixel. The operational circuit measures parameters A and B shown in FIG. 16 from an output image of the edge detection filter and inputs the measured parameters A and B in the preset misalign inspecting algorithm to determine the misalign degree.

The PNL may be implemented as a display panel of a flat panel display such as a Liquid Crystal Display (LCD), a Field Emission Display (FED), a Plasma Display Panel (PDP), an Organic Light Emitting Display (OLED), and an Electrophoresis display (EPD).

Figure 4:
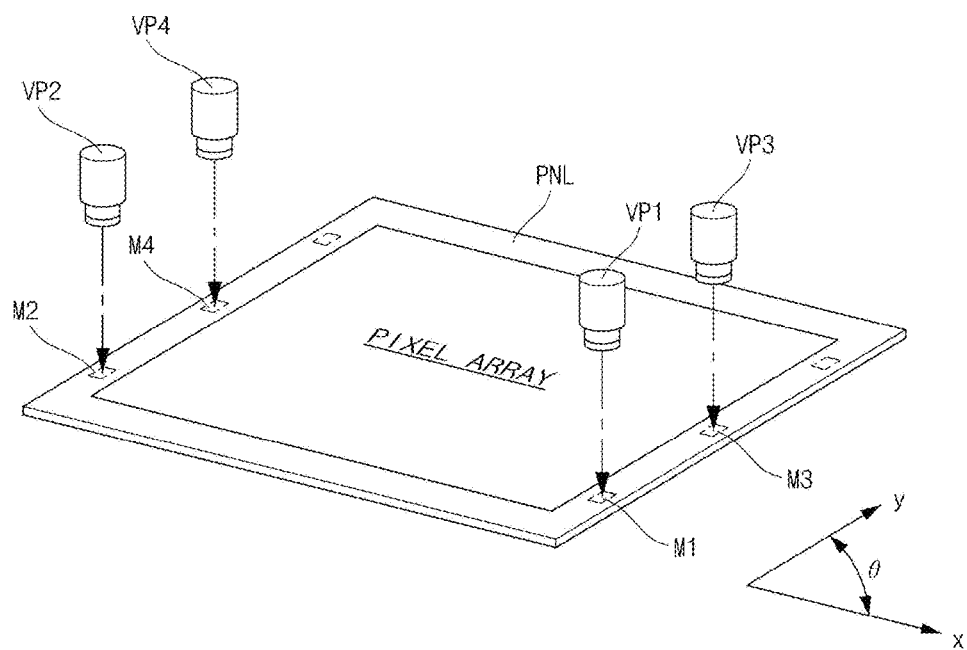
FIG. 4 is a perspective view illustrating the display panel and a second vision system according to one embodiment.

The display panel PNL is mounted on the second align stage ST2. The second align stage ST2 may absorb the display panel PNL. The second align stage ST2 minutely controls a position of the display panel PNL in the x axis, y axis, and θ directions under control of the controller CTRL to correct a location error of the display panel PNL as shown in FIG. 4. The second align stage ST2 may perform a straight line motion by a robot which is not shown to advance and back.

The first and second vision modules VP1 and VP2 of the second vision system VP1 through VP4 image align mark images M1 and M2 in both sides of a top end or a bottom end of the display panel PNL corresponding to the dummy patterns DUM1 and DUM2 of the FPR above the second align stage ST2. The third and fourth vision modules VP3 and VP4 of the second vision system VP1 through VP4 image align mark images M3 and M4 in both sides of the center of the display panel PNL corresponding to both central patterns of the FPR above the second align stage ST2. The second vision system VP1 through VP4 serves as an image sensor for imaging and transmitting an align mark image in a preset location on the display panel PNL to the controller CTRL under control of the controller CTRL.

The straight degree of the display panel PNL is very high due to characteristics of a substrate. Accordingly, the controller CTRL analyzes images imaged by the third and fourth vision systems VP3 and VP4 to determine a center line of the display panel PNL almost without errors. The center line of the display panel PNL may be set as a boundary between display lines located in a central part of the pixel array. Third and fourth align marks M3 and M4 formed in both sides of the center of the display panel PNL instruct a center line location of the display panel PNL.

The drum DR is provided between the first align stage ST1 and the second align stage ST2. The drum DR may be rotated by a motor under control of the controller CTRL and may be moved in up and down directions or in up, down, left and right directions. The drum DR receives the FPR from the first align stage ST1 and positions the FPR on the display panel PNL mounted on the second align stage ST2. An adhesion layer having a week viscosity or absorption tools may be formed in the drum DR so that the FPR may be stably wound around the drum DR.

The controller CTRL controls a series of operations of all constituent elements constituting an align system according to a preset align program to control an overall align procedure between the display panel PNL and the FPR.

An aligning method of the display panel PNL and the FPR will be described as follows.

As shown in FIG. 1A, the present invention fixes the FPR on the first align stage ST1 and then confirms an aligned state of the FPR through the first vision system VR1 through VR5. The controller CTRL previously stores a distance between the dummy patterns DUM1 and DUM2 and retardation patterns PR1 and PR2 located in the center in the FPR. The controller CTRL confirms a location of one of the dummy patterns DUM1 and DUM2 based on a dummy pattern image acquired by the first and second vision modules VR1 and VR2, and drives the first align stage ST1 to move the FPR in a y axis direction by a preset distance. In this case, until a center line of the FPR matches with a virtual reference line previously set by the controller CTL, a position of the FPR may be controlled in x axis and θ axis directions by the first align stage ST1. The virtual reference line is a line which is previously set by the controller CTRL and is displayed on a monitor.

The controller CTRL confirms a location of one of the dummy patterns DUM1 and DUM2 based on a dummy pattern image acquired by the first and second vision modules VR1 and VR2, and drives the first align stage ST1 to move the FPR in a y axis direction by a preset distance.

The controller CTRL matches a center line of a confirmed FRP based on an image acquired from the third and fourth vision modules VR3 and VR4 with a preset virtual reference line. Simultaneously, the controller CTRL compares a central image of the FPR acquired from the fifth vision module VR5 with both images of the center of the FPR acquired from the third and fourth vision modules VR3 and VR4 to determine a bending degree of a center line of the FPR and a center line location in a center of the FPR. Based on the determined result, the controller CTRL matches the center of a center line of the FPR with the center of a center line of the display panel PNL within a preset allowable align margin.

Figure 1B:
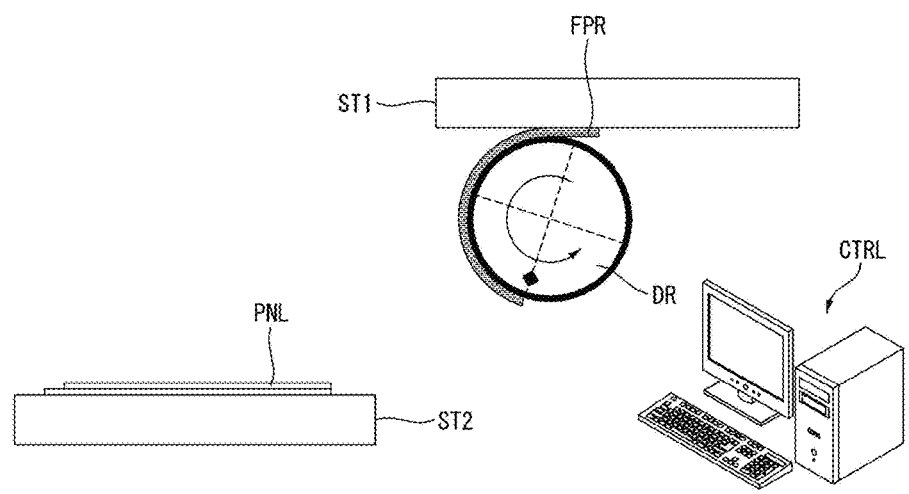

Next, the present invention aligns the FPR on the first align stage ST1 and moves the first align stage ST1 to a direction of the drum DR or moves the drum DR to the first align stage ST1 as shown in FIG. 1B to make a surface of the drum DR contact with the FPR and then rotate the drum DR counterclockwise, thereby moving the FPR to the drum DR. After that, the present invention peels a release film of the FPR on the drum DR to expose an adhesion agent of the FPR. The release film may be peeled manually or automatically by an automation peeling device which is not shown.

Figure 1C:
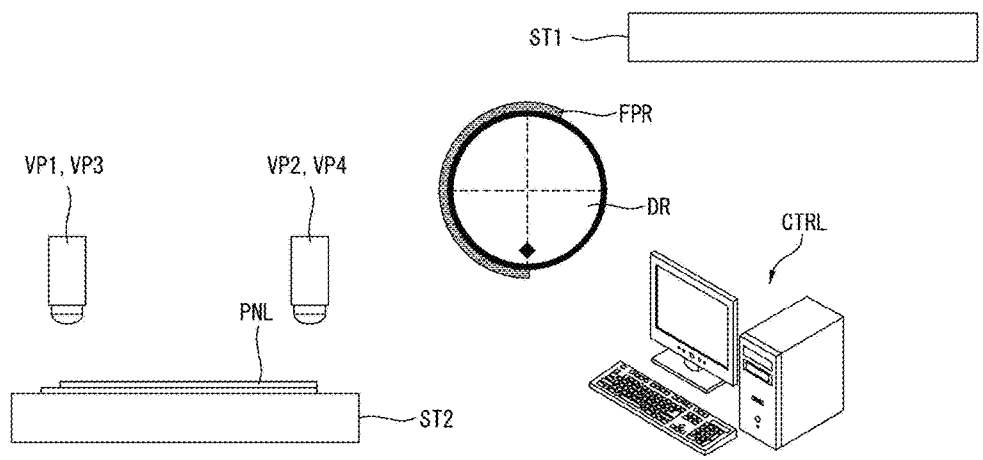

Next, the present invention confirms an aligned state of the display panel PNL based on images of align marks M1 through M4 of the display panel PNL acquired through the second vision system VP1 through VP4 as shown in FIG. 1C. If the aligned state of the display panel PNL has an error from a desired location, the present invention drives the second align stage ST2 to control the aligned state of the display panel PNL. The controller CTRL matches a confirmed center line of the display panel PNL based on confirmed images of align marks M3 and M4 from the third and fourth vision modules VP3 and VP4 with a virtual reference line.

Figure 1D:
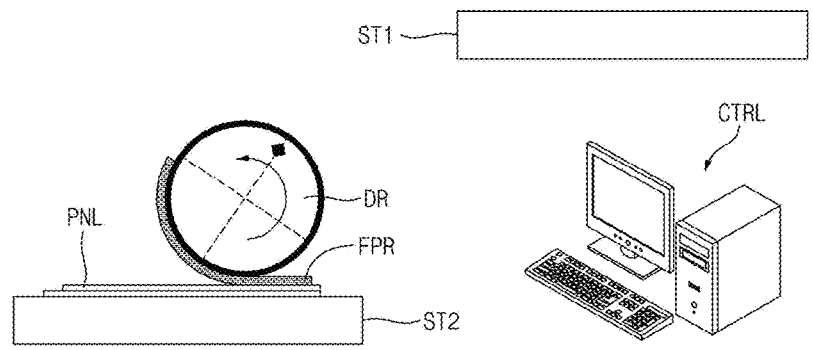

The present invention controls at least one of the first and second stages ST1 and ST2 to match the center of a center line of the FPR with the center of a central line of the display panel PNL within a predetermined allowable align margin. As described above, the present invention may match the center of the center line of the FPR with the center of the center line of the display panel PNL through the medium of the virtual reference line. If the FPR and the display panel PNL are aligned, the present invention moves the second align stage ST2 to the drum DR or moves the drum DR to the second align stage ST2 to make an adhesion agent of the FPR wind around the drum DR contact with a surface of the display panel PNL. Subsequently, as shown in FIG. 1D, the present invention adheres the FPR on the display panel PNL while rotating the drum DR counterclockwise.

Figure 5:
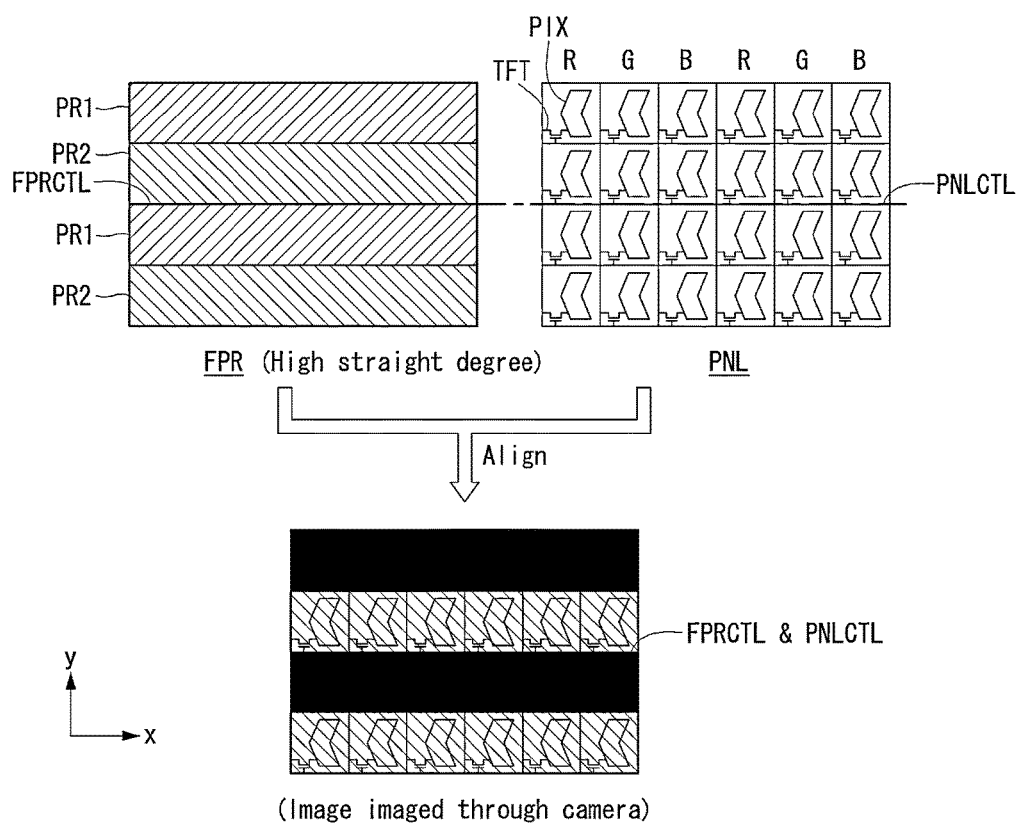
FIG. 5 is a diagram illustrating an example of ideally aligning the FPR and the display panel when a straight degree of the FPR is high according to one embodiment.

FIG. 5 is a diagram illustrating an example of ideally aligning the FPR and the display panel when a straight degree of the FPR is high. In FIG. 5, the term "PIX" refers to a pixel electrode of a pixel formed in a pixel array of the display panel PNL, and the term "TFT" refers to a thin film transistor (TFT) connected to the pixel electrode.

Figure 6A:
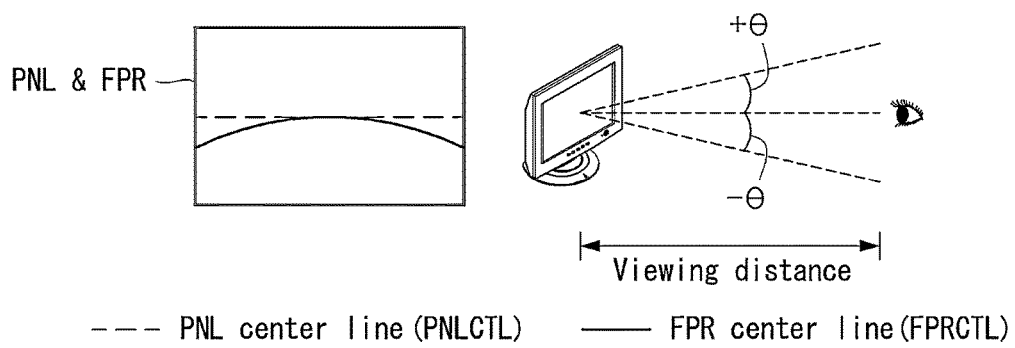
FIGS. 6A to 6C are diagrams illustrating a method of bonding the FPR having a low straight degree to the display panel according to an exemplary embodiment of the present invention.
Figure 6B:
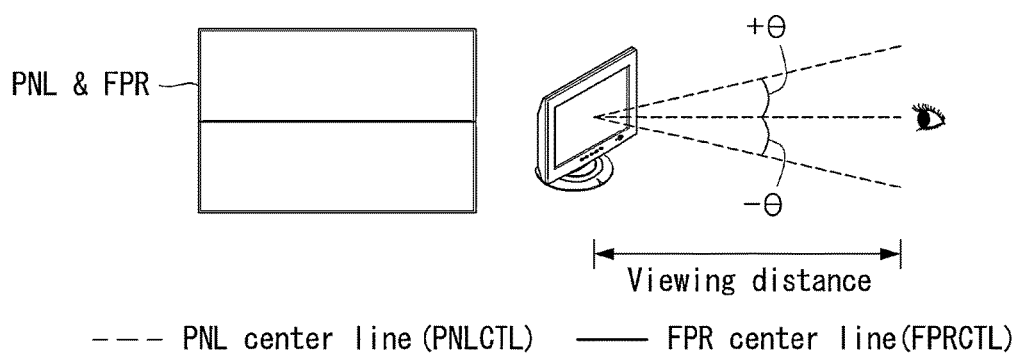
Figure 6C:
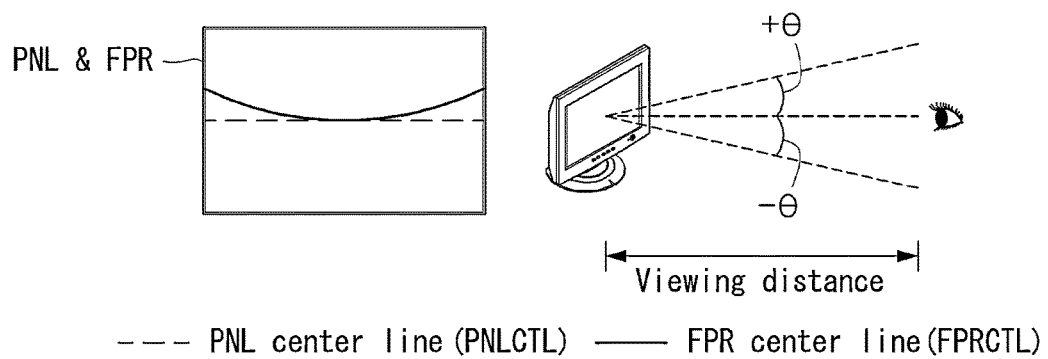

FIGS. 6A to 6C are diagrams illustrating examples where there is an interval between center lines FPRCTL and PNLCTL of the FPR and of the display panel PNL when the straight degree of the FPR is low.

If a straight degree of the FPR is high, a straight degree of the center line FPRCTL of the FPR is also high. In this case, as shown in FIG. 5, a center line FPRCTL of the FPR may uniformly match with the center line PNLCTL of the display panel PNL. In this case, upper and lower viewing angles of the stereoscopic image display are wide. The upper and lower viewing angles include an upper viewing angle +θ higher than a front viewing angle being a right angle (90°) and a lower viewing angle −θ lower than the front viewing angle. If the center line FPRCTL of the FPR uniformly matches with the center line PNLCTL of the display panel PNL, the upper viewing angle +θ and the lower viewing angle −θ are substantially the same as each other and wide. A lower end of the FIG. 5 illustrates the FPR adhering to the display panel PNL in a state that the FPR and the display panel PNL are ideally aligned and an image imaged by a camera in a vision module through a polarizing plate disposed in front of a lens of the vision modules VR1 through VR5. If an optical axis of the polarizing plate disposed in front of a lens of the vision module corresponds to an optical axis of the second retardation pattern PR2, as illustrated in a lower end of the FIG. 5, since only polarized light transmitting the second retardation pattern PR2 is incident to the camera, an image viewed through the second retardation pattern PR2 is bright. Meanwhile, because polarized light transmitting the first retardation pattern PR1 cannot transmit a polarizing plate disposed in front of the lens of the vision module, an image viewed through the first retardation pattern PR1 is dark. In addition, if an optical axis of the polarizing plate disposed in front of the vision module corresponds to an optical axis of the first retardation pattern PR1, because only polarized light transmitting the first retardation pattern PR1 is incident to the camera, the image viewed through the first retardation pattern PR1 is bright and the image viewed through the second retardation pattern PR2 is dark. The polarizing plate disposed in front of the lens of the vision module may be implemented as one of a left-eye polarizing filter or a right-eye polarizing filter of polarizing glasses worn when the user views a 3D image.

Because strength of a base film in the FPR is lowered and the FPR is flexible, a straight degree may be reduced. In this case, a straight degree of the center line FPRCTL of the FPR is lowered. When aligning the FPR having a low straight degree, if matching both sides of a center line of the FPR with align marks M3 and M4 of both sides of the center side of the display panel PNL, when viewed from a center of the FPR and the display panel PNL, an interval between the center line FPRCTL of the FPR and the center line PNLCTL of the display panel PNL is increased. If there is an interval between the center of the center line FPRCTL of the FPR and the center of the center line PNLCTL of the display panel PNL, an upper viewing angle +θ and a lower viewing angle −θ of an upper/lower stereoscopic image display are asymmetrical and one of the upper viewing angle +θ and the lower viewing angle −θ becomes narrow.

When aligning the FPR having a low straight degree on the display panel PNL, to prevent the upper and lower viewing angles from being asymmetrically narrow, the present invention matches center lines FPRCLT and PNLCTL in a central part of the display panel PNL with a central part of the FPR. If the FPR matches with center lines of the display panel PNL based on a central part of center lines of the FPR and the display panel PNL, upper and lower viewing angles felt by the user may be implemented by upper and lower viewing angles like an ideal alignment state.

FIGS. 6A to 6C are an alignment system of a display panel and an FPR of a stereoscopic image display and an aligned state of center lines of the FPR and the display panel aligned by the alignment system.

As illustrated in FIG. 6A, when the center of a center line of the FPR is concavely bent than both sides of the center line, the present invention matches the center of a center line of the FPR with the center of a center line of the display panel PNL within a predetermined allowable align margin. An interval between the center of a center line of the FPR and the center of a center line of the display panel PNL is less than an interval between both edges of the center line of the FPR and both edges of a center line of the display panel PNL.

As shown in FIG. 6B, when a center line of the FPR is straight because a straight degree of the FPR is high, the present invention matches the center of the center line of the FPR with the center of the center line of the display panel PNL within a predetermined allowable align margin. In this case, an interval between the center of a center line of the FPR and the center of a center line of the display panel is substantially the same as an interval between both edges of the center line of the FPR and both edges of the center line of the display panel PNL.

As shown in FIG. 6C, when the center of the center line of the FPR is drooped downward than both side of the center line, the present invention matches the center of the center line of the FPR with the center of the center line of the display panel PNL within a predetermined allowable align margin. In this case, an interval between the center of the center line of the FPR and the center B of the center line of the display panel PNL is less than an interval of both edges of the center line of the FPR and both edges of the center line of the display panel PNL.

A viewer may wear polarization glasses to view a stereoscopic image of the display panel PNL viewed through the FPR. A left-eye polarized light filter of the polarization glasses transmits only first polarized light of a left-eye image incident through the first retardation pattern PR1, whereas a right-eye polarized light filter of the polarization glasses transmits only second polarized light of a right-eye image incident through the second retardation pattern PR2.

Figure 7:
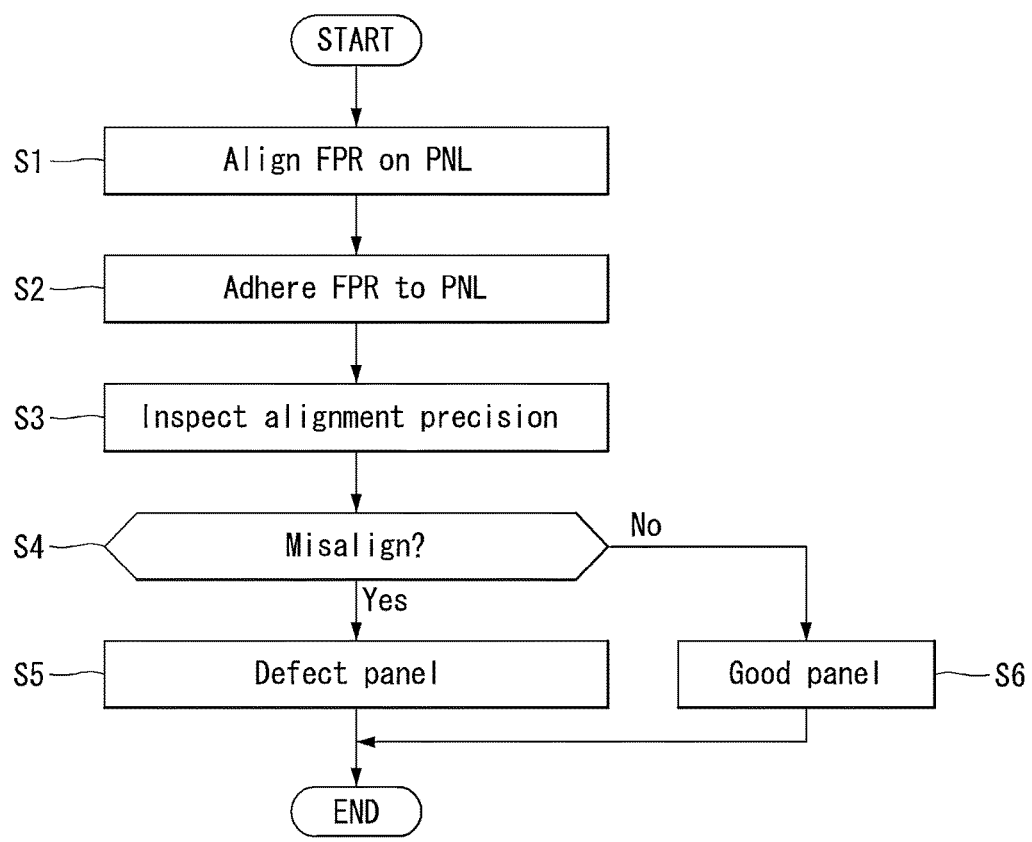
FIG. 7 is a flowchart illustrating a method of inspecting misalignment according to according to an exemplary embodiment of the present invention.

FIG. 7 is a flow chart illustrating a method of inspecting misalignment between the display panel and the FPR. The flowchart of FIG. 7 illustrates a procedure for aligning the FPR on the PNL to confirming misalignment by stages.

Referring to FIG. 7, the present invention aligns the FPR on the PNL (S1) and adheres the FPR to the PNL (S2).

Next, the present invention inspects alignment precision with respect to an inspection target panel (S3). The inspection target panel refers to a display panel PNL to which the FPR adheres through steps S1 and S2. The procedure of inspecting the alignment precision will be described in detail with reference to FIGS. 8 to 16.

As a result of inspecting the alignment precision, if the misalign degree exceeds a preset allowable misalign range, the inspection target panel is determined as a defect panel (S4 and S5). Conversely, if the misalign degree is within the preset allowable misalign range, the inspection target panel is determined as a good panel (S4 and S6).

Figure 8:
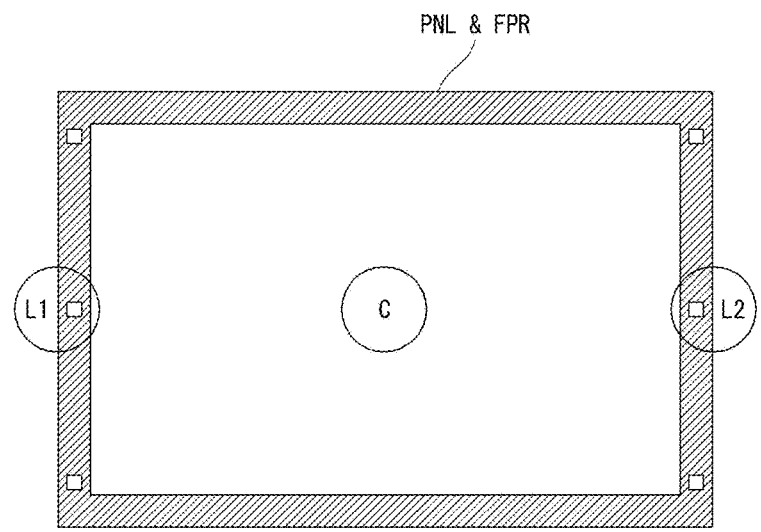
FIG. 8 is a diagram illustrating an inspected location of a misalignment according to one embodiment.

In the procedure of inspecting the alignment precision, a misalign inspecting location may be two locations L1 and L2 in edges of both sides of the inspection target panel which a central part align marks M3 and M4 are disposed as shown in FIG. 8. FIG. 9 is a diagram illustrating an apparatus for inspecting misalignment in both sides of the inspection target panel.

The misalign inspecting location may be a central part C of a pixel array in the inspection target panel having no align mark. FIG. 13 is a diagram illustrating an apparatus for inspecting misalignment in the central part C of a pixel array.

The misalign inspecting location set in the procedure of inspecting alignment precision may be both edges L1 and L2 of the inspection target panel and a central part C of the pixel array in FIG. 8. In this case, the apparatus for inspecting misalign may include three vision modules having vision modules V1 and V2 shown in FIG. 9 and vision module V3 shown in FIG. 13.

Figure 10:
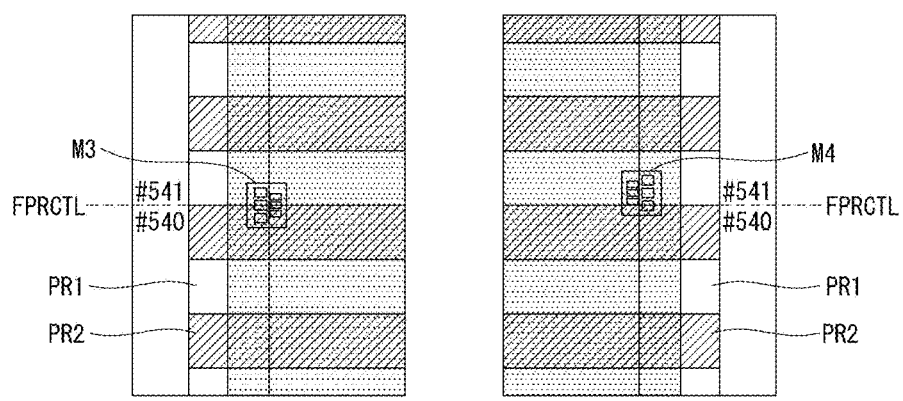
FIG. 10 is a diagram illustrating an example of an image imaged by vision modules shown in FIG. 9 according to one embodiment.

FIG. 9 is a diagram illustrating an apparatus for inspecting misalignment according to one embodiment of the present invention. FIG. 10 is a diagram illustrating an example of an image imaged by vision modules shown in FIG. 9. In FIG. 10, reference numerals "#540 and #541" refer to retardation patterns PR1 and PR2 located in five hundreds fortieth and five hundreds forty first lines of the FPR on the inspection target panel.

Referring to FIGS. 9 and 10, the apparatus for inspecting misalign includes align marks M3 and M4 located in the center of edges of both sides of the inspection target panel and first and second vision modules V1 and V2 for imaging images around the align marks M3 and M4.

The first and second vision modules V1 and V2 perform photoelectric conversion with respect to light incident through the polarizing plate transmitting specific polarized lights, respectively. Accordingly, the align marks M3 and M4 are viewed from the imaged by the first and second vision modules V1 and V2 through one of the first and second retardation patterns PR1 and PR2, whereas another retardation pattern is darkly viewed.

The controller CTRL analyzes images imaged by the vision modules V1 and V2 to determine whether the center of the align marks M3 and M4 corresponding to the center line PNLCTL of the display panel PNL matches with the center line FPRCTL of the FPR, and measures an interval between the center of the align marks M3 and M4 and the center line FPRCTL of the FPR. If the center of the align marks M3 and M4 matches with the center line FPRCTL of the FPR or the interval between the center of the align marks M3 and M4 and the center line FPRCTL of the FPR is within a preset allowable align margin, the controller CTRL determines that the misalign degree of the inspection target panel satisfies a good product determination reference.

When inspecting alignment precision using the apparatus for inspecting misalign as illustrated in FIG. 9, the controller CTRL may calculate a distance between the center of the align marks M3 and M4 and the center line of the FPR and determine the misalign degree based on the calculated distance. In a method of inspecting disalign by an apparatus for inspecting misalign as illustrated in FIG. 9, an FPR having a relative high straight degree needs to be bonded to the display panel PNL, align marks M3 and M4 and a center line FPRCTL of the FPR are clearly viewed from an image imaged by the vision modules V1 and V2. Accordingly, the FPR having a high straight degree adheres to the display panel PNL and the apparatus for inspecting misalign as illustrated in FIG. 9 is applicable to the inspection target panel in which the align marks M3 and M4 and the center line FPRCTL of the FPR are clearly viewed.

Figure 11:
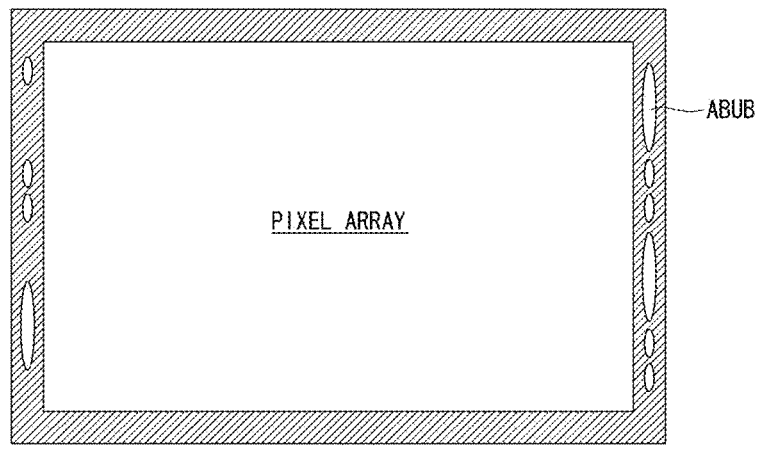
FIG. 11 is a plan view illustrating a bubble existing between the FPR and the display panel in an edge of the display panel.
Figure 12:
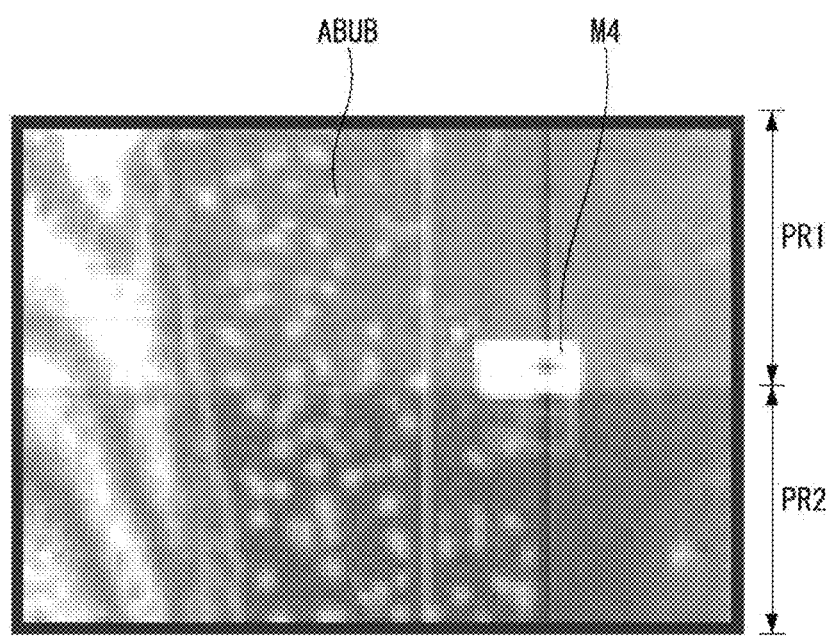
FIG. 12 is a diagram illustrating an actual image of the bubble.

If the FPR adheres to the display panel PNL through steps S1 and S2 of FIG. 7, a bubble ABUB may be blended between the FPR and the display panel PNL in an edge of the display panel PNL as shown in FIGS. 11 and 12. In this case, the align marks M3 and M4 at which the vision modules V1 and V2 of the apparatus for inspecting misalign face as illustrated in FIG. 9 looks may be dimly or rarely viewed as illustrated in FIG. 12. In this case, the controller CTRL has a difficulty in determining a misalign degree by a method of analyzing images received from the apparatus for inspecting misalign as illustrated in FIG. 9. When inspecting alignment precision using the apparatus for inspecting misalign as illustrated in FIG. 9, if the FPR having a low straight degree adheres to the display panel PNL, it is difficult to exactly measure the misalign degree. This is because a misalign degree measured using the apparatus for inspecting misalign as illustrated in FIG. 9 according to the straight degree of the FPR differs from the misalign degree of the center of the inspection target panel.

Figure 14:
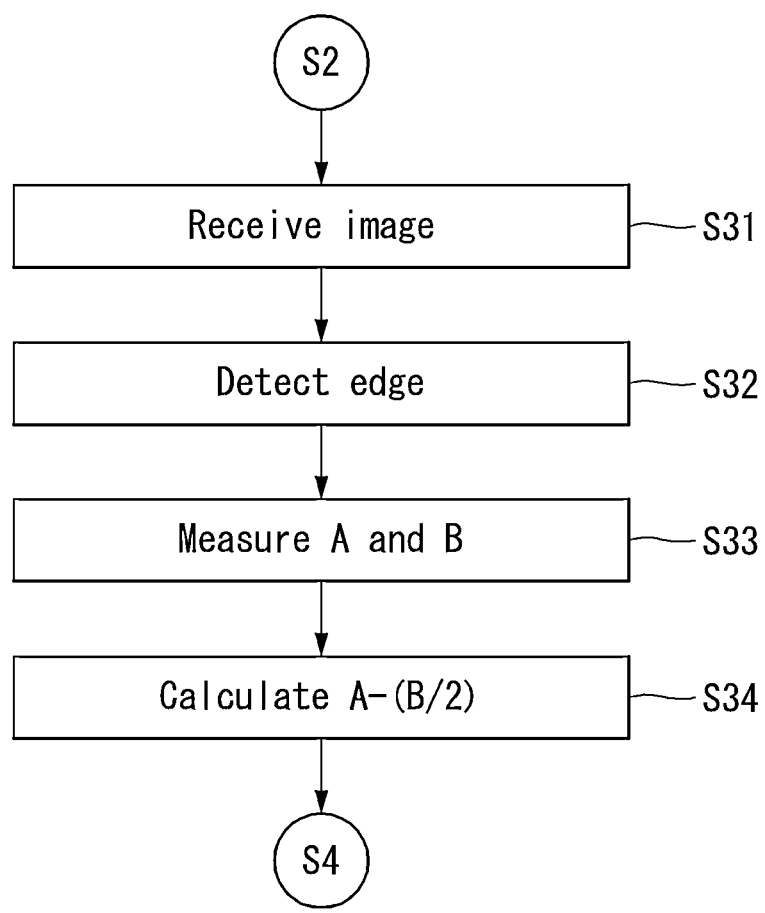
FIG. 14 is a flowchart illustrating a process of inspecting alignment precision using the apparatus for inspecting misalignment shown in FIG. 13 according to one embodiment.

FIG. 13 is a diagram illustrating an apparatus for inspecting misalignment according to one of the present invention. FIG. 14 is a flowchart illustrating a process of inspecting alignment precision using the apparatus for inspecting misalignment shown in FIG. 13.

Referring to FIGS. 13 and 14, the apparatus for inspecting misalignment includes a vision module V3 for imaging a pixel array center image of the inspection target panel.

When determining a misalign degree based on the image imaged from the vision module V3, the controller CTRL automatically calculates the misalign degree by a misalign inspection algorithm as illustrated in FIG. 14.

The controller CTRL detects an edge from the image received from the vision module V3 (S31 and S32). The controller CTRL compares the edge pattern (right side of the FIG. 15) detected in steps S31 and S32 with pixel patterns previously stored in the memory to determine whether the edge pattern is the pixel pattern. When there is an edge pattern substantially the same as or similar to the edge pattern among the stored pixel patterns or similarity is higher than a preset reference value, the edge pattern is determined as the pixel pattern.

Figure 15:
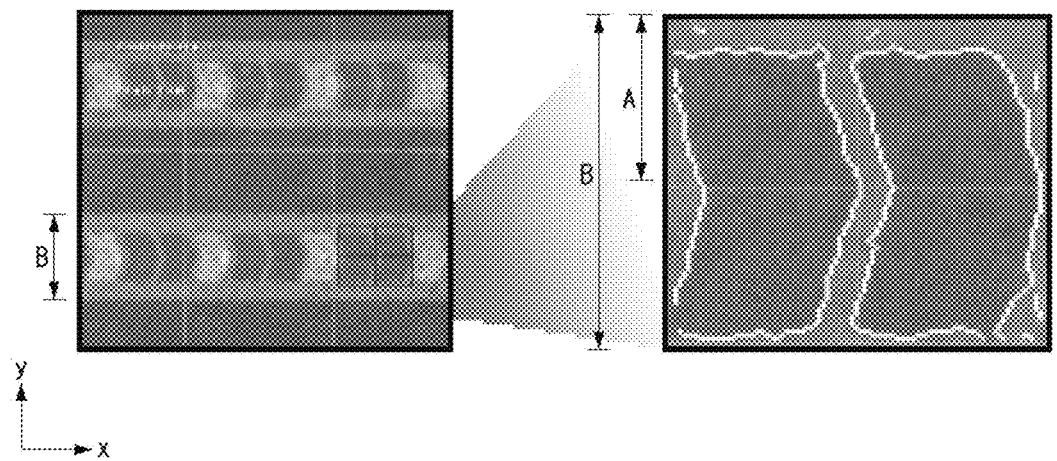
FIG. 15 is a diagram illustrating an actual example of an image imaged by the apparatus for inspecting misalignment shown in FIG. 13 and an edge detection image with respect to the image.

The controller CTRL measures the center of a vertical direction (y axis direction) of a pixel pattern estimated through the edge detection procedure, and a distance between a white gray level and a black gray level in an image received from the vision module V3 as illustrated in FIG. 15, and stored the result in the memory as a parameter A. If the pixel pattern is a pattern whose center is bent, a vertical direction center of the pixel pattern is a part bent from a side of the edge detection pattern. The controller CTRL measures a y axis direction height of a line viewed as a white gray level from an image received from the vision module V3, and store the result in the memory as a parameter B (S33). A boundary line between a white gray level and a black gray level in the image received from the vision module V3 may be the center line FPRCTL of the FPR or a boundary between the first and second retardation patterns PR1 and the PR2 which exist in a location adjacent to the center line FPRCTL. The line viewed as the white gray level from the image received from the vision module V3 is a line brightly viewed through one of the first and second retardation patterns PR1 and PR2 from the FPR as clearly illustrated in FIG. 15.

A parameter B may be previously set in the FPR as one design value (theoretical value) of one of the retardation patterns PR1 and PR2 and may be a theoretical value previously stored in the memory. In this case, a procedure of measuring the parameter B may be omitted.

Figure 16:
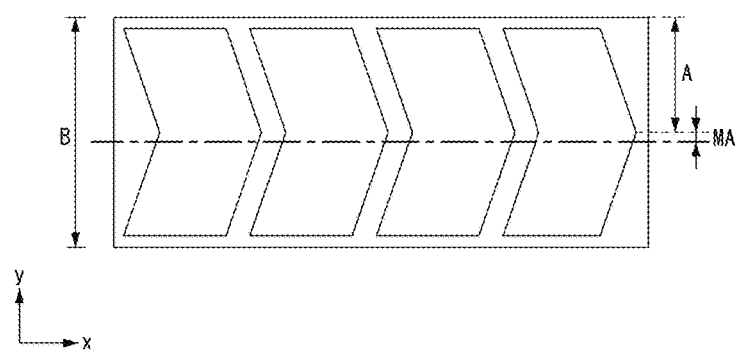
FIG. 16 is a diagram illustrating misalignment and parameters which are applied to the method of inspecting misalign according to one embodiment.

The controller CTRL calculates A−(B/2) in step S34 and stores the calculation result as a misalign value MA of FIG. 16, and compares the misalign value MA with an allowable misalign range in step S4 of FIG. 7.

Since the method of inspecting misalign using the apparatus for inspecting misalign as illustrated in FIG. 13 analyzes an image of a central part of the inspection target panel, it may exactly measure a misalign degree when using the FPR in which align marks M3 and M4 are not viewed or a straight degree is low.

The apparatus for inspecting misalign according to another embodiment of the present invention includes three vision modules shown in FIGS. 9 and 13, determines a misalign degree of edges of a panel based on the align marks M3 and M4 in the locations L1 and L2 of FIG. 8 and the center line FPRCTL of the FPR, and measures the misalign degree of the central part of the panel based on parameters A and B in the point C of FIG. 8.

The present invention images edge images of both sides of the inspection target panel and/or a central image of the pixel array of the inspection target panel, and automatically measures the misalign degree between the FPR and the display panel based on the analysis result of the images. As a result, the present invention can rapidly and exactly measure the misalign degree between the FPR and the display panel.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for inspecting misalignment between a display panel and a film patterned retarder, comprising:
   an inspection target panel including the display panel to which the film patterned retarder adheres;
   a misalign inspector for imaging edge images of both sides of the inspection target panel and imaging a central part image of a pixel array of the inspection target panel, wherein the central part image has no align mark; and
   a controller for analyzing an image received from the misalign inspector to measure a misalign degree between the film patterned retarder and the display panel,
   wherein, the controller detects an edge from the central part image of the pixel array received from the misalign inspector using an edge detection filter to detect a pixel pattern,
   measures a distance between a vertical direction center of the pixel pattern in one line of the display panel viewed in the central part image and an edge of neighboring retardation patterns of the film patterned retarder viewed in the central part image to store the measured distance as a first parameter A,
   stores a vertical direction height from a top edge to a bottom edge of the retardation pattern overlapped with the one line viewed in the central part image of the pixel array as a second parameter B, and
   calculates A−(B/2) and determines the calculated A−(B/2) as a misalign value.

2. The system of claim 1, wherein the vertical direction height from the top edge to the bottom edge of the retardation pattern is previously set as a design value of the film patterned retarder.

3. The system of claim 1, wherein the controller further measures a first interval between a center of a first align mark formed at a first edge of a first side of the display panel based on edge images of the inspection target panel received from the misalign inspector and a center line of the retardation patterns formed in the film patterned retarder, and
   wherein the controller further measures a second interval between a center of a second align mark formed at a second edge of a second side of the display panel based on edge images of the inspection target panel received from the misalign inspector and a center line of the retardation patterns formed in the film patterned retarder,
   wherein the center line of the retardation patterns formed in the film patterned retarder is a boundary line between the neighboring retardation patterns which are located in a center of the film patterned retarder.

4. A system for inspecting misalignment between a display panel and a film patterned retarder, comprising:
   an inspection target panel including the display panel to which the film patterned retarder adheres;
   a misalign inspector for imaging edge images of both sides of the inspection target panel and imaging a central part image of a pixel array of the inspection target panel, wherein the central part image has no align mark; and
   a controller for analyzing an image received from the misalign inspector to measure a misalign degree between the film patterned retarder and the display panel,
   wherein, the controller detects an edge from the central part image of the pixel array received from the misalign inspector using an edge detection filter to detect a pixel pattern,
   measures a distance between a vertical direction center of the pixel pattern in one line of the display panel viewed in the central part image and an edge of neighboring retardation patterns of the film patterned retarder viewed in the central part image to store the measured distance as a first parameter A,
   measures a vertical direction height from a top edge to a bottom edge of the retardation pattern overlapped with the one line viewed in the central part image of the pixel array as a second parameter B, and
   calculates A−(B/2) and determines the calculated A−(B/2) as a misalign value.

5. The system of claim 4, wherein the vertical direction height from the top edge to the bottom edge of the retardation pattern is previously set as a design value of the film patterned retarder.

6. The system of claim 4, wherein the controller further measures a first interval between a center of a first align mark formed at a first edge of a first side of the display panel based on edge images of the inspection target panel received from the misalign inspector and a center line of the retardation patterns formed in the film patterned retarder, and
   wherein the controller further measures a second interval between a center of a second align mark formed at a second edge of a second side of the display panel based on edge images of the inspection target panel received from the misalign inspector and a center line of the retardation patterns formed in the film patterned retarder,
   wherein the center line of the retardation patterns formed in the film patterned retarder is a boundary line between the neighboring retardation patterns which are located in a center of the film patterned retarder.

7. A method of inspecting misalignment between a display panel and a film patterned retarder on an inspection target panel including the display panel to which the film patterned retarder adheres, the method comprising:
   imaging edge images of both sides of the inspection target panel and imaging a central part image of a pixel array of the inspection target panel, wherein the central part image has no align mark; and
   analyzing at least one image imaged from the inspection target panel to measure a misalign degree between the film patterned retarder and the display panel,
   wherein, the measuring of the misalign degree comprises;
   detecting an edge from the central part image of the pixel array using an edge detection filter to detect a pixel pattern,
   measuring a distance between a vertical direction center of the pixel pattern in one line of the display panel viewed in the central part image and an edge of neighboring retardation patterns of the film patterned retarder viewed in the central part image to store the measured distance as a first parameter A,
   storing a vertical direction height from a top edge to a bottom edge of the retardation pattern overlapped with the one line viewed in the central part image of the pixel array as a second parameter B, and calculating A−(B/2) and determining the calculated A−(B/2) as a misalign value.

8. The method of claim 7, wherein the vertical direction height from the top edge to the bottom edge of the retardation pattern is previously set as a design value of the film patterned retarder.

9. The method of claim 7, wherein the measuring of the misalign degree further comprises;
   measuring a first interval between a center of a first align mark formed at a first edge of a first side of the display panel based on edge images of the inspection target panel and a center line of the retardation patterns formed in the film patterned retarder; and
   measuring a second interval between a center of a second align mark formed at a second edge of a second side of the display panel based on edge images of the inspection target panel received from the misalign inspector and a center line of the retardation patterns formed in the film patterned retarder,
   wherein the center line of the retardation patterns formed in the film patterned retarder is a boundary line between the neighboring retardation patterns which are located in a center of the film patterned retarder.

10. A method of inspecting misalign between a display panel and a film patterned retarder on an inspection target panel including the display panel to which the film patterned retarder adheres, the method comprising:
   imaging edge images of both sides of the inspection target panel and imaging a central part image of a pixel array of the inspection target panel, wherein the central part image has no align mark; and
   analyzing at least one image imaged from the inspection target panel to measure the misalign degree between the film patterned retarder and the display panel,
   wherein, the measuring of the misalign degree comprises;
   detecting an edge from the central part image of the pixel array using an edge detection filter to detect a pixel pattern,
   measuring a distance between a vertical direction center of the pixel pattern in one line of the display panel viewed in the central part image and an edge of neighboring retardation patterns of the film patterned retarder viewed in the central part image to store the measured distance as a first parameter A,
   measuring a vertical direction height from a top edge to a bottom edge of the retardation pattern overlapped with the one line viewed in the central image of the pixel array as a second parameter B, and
   calculating A−(B/2) and determining the calculated A−(B/2) as a misalign value.

11. The method of claim 10, wherein the vertical direction height from the top edge to the bottom edge of the retardation pattern is previously set as a design value of the film patterned retarder.

12. The method of claim 10, wherein the measuring of the misalign degree further comprises;
   measuring a first interval between a center of a first align mark formed at a first edge of a first side of the display panel based on edge images of the inspection target panel and a center line of the retardation patterns formed in the film patterned retarder; and
   measuring a second interval between a center of a second align mark formed at a second edge of a second side of the display panel based on edge images of the inspection target panel received from the misalign inspector and a center line of the retardation patterns formed in the film patterned retarder,
   wherein the center line of the retardation patterns formed in the film patterned retarder is a boundary line between the neighboring retardation patterns which are located in a center of the film patterned retarder.

* * * * *